(12) United States Patent
Bruno et al.

(10) Patent No.: US 6,262,978 B1
(45) Date of Patent: Jul. 17, 2001

(54) CALL COMPLETION OF VIDEO TELEPHONE/TELECONFERENCE CALL AS PACKET VOICE CALL

(75) Inventors: Richard Frank Bruno, Morristown; Howard Paul Katseff, Englishtown; Robert Edward Markowitz, Glen Rock, all of NJ (US); Joseph Thomas O'Neil, Staten Island, NY (US); Bethany Scott Robinson, Lebanon; Kenneth H. Rosen, Middletown, both of NJ (US)

(73) Assignee: AT&T Corp., Middletown, NJ (US)

( * ) Notice: Subject to any disclaimer, the term of this patent is extended or adjusted under 35 U.S.C. 154(b) by 0 days.

(21) Appl. No.: 09/045,352

(22) Filed: Mar. 20, 1998

(51) Int. Cl.[7] .......................... H04L 12/16; H04L 12/66; H04L 12/28; H04L 12/56; H04Q 11/00
(52) U.S. Cl. .......................... 370/260; 370/263; 370/264; 370/352; 370/389
(58) Field of Search .................................. 370/260, 352, 370/389, 392, 395, 401, 413, 201, 264, 259, 263; 248/16, 12, 20

(56) References Cited

U.S. PATENT DOCUMENTS

| | | | |
|---|---|---|---|
| 5,625,407 | 4/1997 | Biggs et al. | |
| 5,689,553 | * 11/1997 | Ahuja et al. | 379/202 |
| 5,757,781 | * 5/1998 | Gilman et al. | 370/260 |
| 5,909,431 | * 6/1999 | Kuthyar et al. | 370/260 |
| 5,999,525 | * 12/1999 | Krishnaswamy et al. | 370/352 |
| 6,075,789 | * 6/2000 | Kasslin et al. | 370/395 |
| 6,081,291 | * 6/2000 | Ludwig, Jr. | 348/16 |
| 6,101,189 | * 8/2000 | Tsuruoka | 370/401 |

\* cited by examiner

*Primary Examiner*—Huy D. Vu
*Assistant Examiner*—M. Phan

(57) ABSTRACT

A system and method for establishing a communication path for a call between a video telephone/teleconference call and a packet network telephone terminal through a packet network. The call is routed through a multimedia gateway which performs a conversion process between a video telephone/teleconference domain and a packet network telephone domain.

25 Claims, 4 Drawing Sheets

CALL COMPLETION OF VIDEO TELEPHONE/TELECONFERENCE CALL AS PACKET VOICE CALL

CROSS-REFERENCES TO RELATED APPLICATIONS

This application is related to U.S. patent application Ser. No. 08/547,216 (now U.S. Pat. No. 5,724,355), filed on Oct. 24, 1995, and U.S. patent application Ser. No. 08/671,227 (now U.S. Pat. No. 5,768,513), filed on Jun. 27, 1996.

BACKGROUND OF THE INVENTION

The present invention relates to communication systems and, more specifically, to a method and system for converting video telephone/teleconferencing calls to packet calls and converting packet calls into video telephone/teleconferencing calls.

Providing both multimedia (audio, video, and data) communication products and services to customers is playing an increasingly important role for telecommunications companies today. The power of multimedia communications is evident from the expansion in "videoconferencing", in which a user at a videoconferencing station can communicate "face-to-face" in real-time with someone at a distant videoconferencing station. The introduction of desktop videoconferencing equipment is making multimedia communications even more prevalent. Generally, multimedia communication uses equipment incorporated as part of a general purpose computer or integrated systems specifically designed for the task. Various multimedia products are available that enable users to exchange audio, video, and data through their personal computers (PCs) with one another by communicating over ISDN phone lines or over switched 56 kbps phone lines.

Generally the multimedia equipment used for such teleconferencing conforms to the H.320 or H.323 protocols that have been adopted by the International Telecommunications Union (ITU) as an international standard for videoconferencing. The H.320 standard is a family of videoconferencing standards developed and maintained by the ITU which encompasses a variety of standards for audio compression, video compression, and telephone call set-up and control. The H.320 standard provides for the division of information into three distinct streams: audio, video, and data, where "data" herein is intended to mean digital information that is not meant to be displayed as real-time video or audio, and includes information to be displayed as text, such as documents, and data that is used to control applications or convey status to them. The H.320 standard allows videoconferencing over ISDN and other circuit switched networks and services. The H.323 standard extends the H.320 standards series to handle uneven and unpredictable data flow across the Internet and Local Area Networks (LANs). In particular, H.323 addresses voice communications over packet switched networks.

Currently, videoconferencing equipment users on a circuit switched network and Internet telephony equipment users on a packet network cannot talk from one domain to another because of the disparity of the systems.

SUMMARY OF THE INVENTION

A technical advance is achieved in the art by providing a system and method of implementing a connection through a packet network between a video telephone/teleconference terminal and a packet network telephone (e.g., Internet telephone). The system and method include connecting a video telephone/teleconference call from the video telephone/teleconference terminal to a multimedia gateway and bridging the call from the multimedia gateway to a packet telephone. The system and method include looking up a packet network address of the packet network telephone in a first database and removing an audio stream from the video telephone/teleconference call. The system and method further include transmitting the audio stream in packetized form to the packet network address of the packet network telephone.

DETAILED DESCRIPTION

Figure 1:
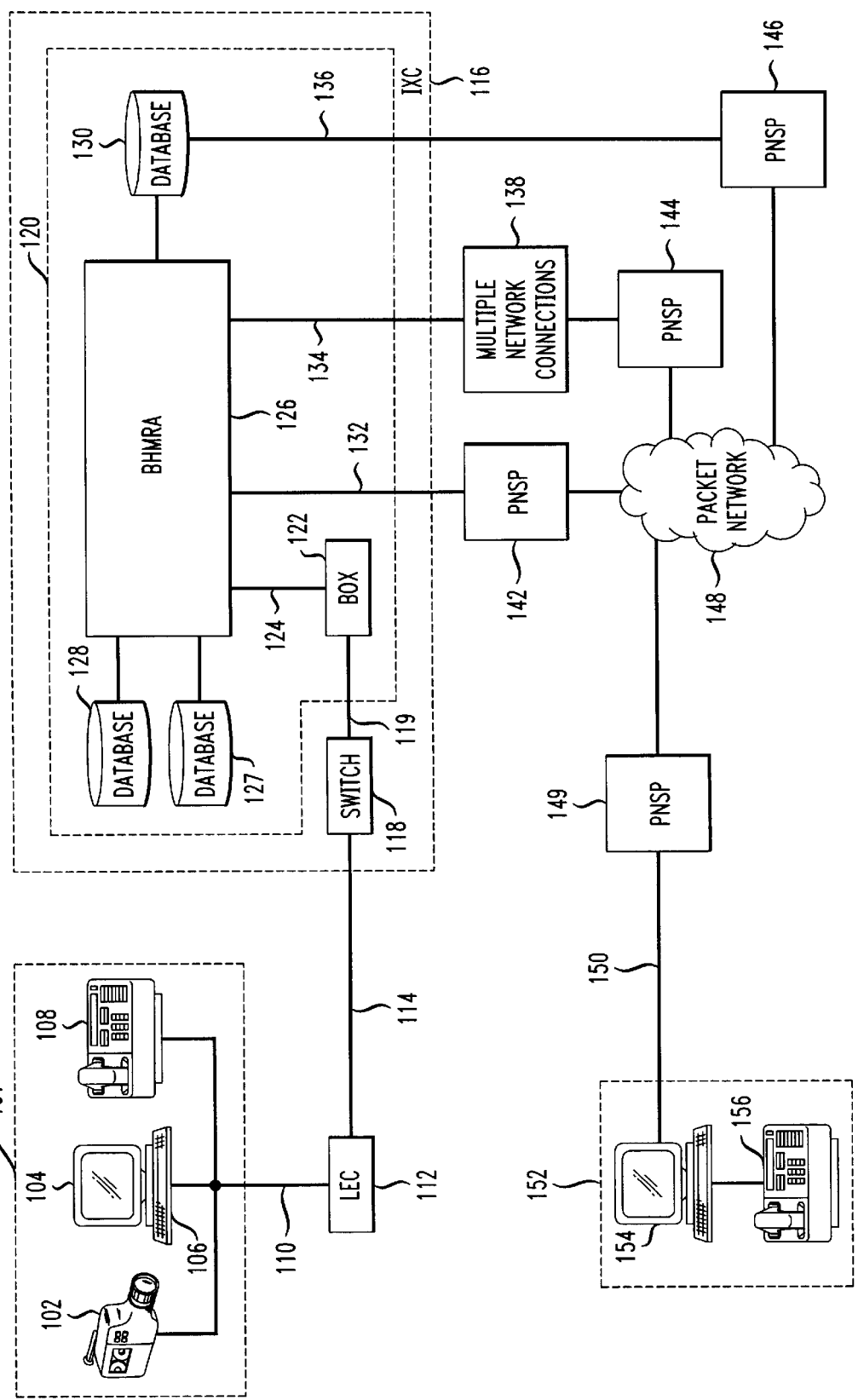
FIG. 1 is a block diagram of a simplified communications system in accordance with an exemplary embodiment of the present invention.

With reference to FIG. 1, a simplified communications system in accordance with a preferred embodiment of the invention is shown. It should be recognized that FIG. 1 may include other elements, which have not been illustrated in order to simplify the figure and which are not necessary to understand the preferred embodiments disclosed herein.

The network illustrated in FIG. 1 includes a video telephone/teleconferencing terminal 101 connected to a terminal 152 through a packet network 148. An example of a packet network is the Internet, which is a vast collection of computers communicating over a packet network allowing information to be transferred between machines across the world. A personal computer typically accesses the Internet through a modem onto a user's "plain old telephone service" (POTS) phone line or through a high-speed local area network (LAN). Information is exchanged over the Internet using a protocol known as TCP/IP (Transmission Control Protocol/Internet Protocol). In order to readily facilitate use of the Internet, a programming interface has been developed providing high-level functions such as sending and receiving data to and from a remote machine on the Internet.

Although the network 148 includes only a single video telephone/teleconferencing terminal 101, an actual network may include many more such terminals, which can communicate with each other in a multimedia fashion over separate audio, video and data streams. Each terminal 101 is compliant with videoconferencing standards such as H.320 or H.324 protocols. The H.324 protocol is a standard for videoconferencing over regular phone lines. As shown illustratively for video telephone/teleconferencing terminal 101, each terminal generally includes a camera 102, a cathode ray tube (CRT) 104, and a processing unit or device 106. A multimedia terminal 101 may also include an associated telephone 108 located external to the processing unit 106 for purposes of dialing another terminal's telephone number when the processing unit 106 is incapable of doing so directly, or if the user wishes to use the telephone 108 instead of using the processing unit. The processing unit 106 may be a general purpose computer with multimedia capable equipment incorporated therein, which allows a conventional PC to perform video and ISDN communications that are compliant with protocols such as H.320. Alternatively, the processing unit 106 may be a multimedia specific device.

The terminal 101 is designed to communicate over a variety of communication lines or paths. Typically, H.320 devices run on an ISDN Basic Rate Interface (BRI) or a switched 56 kbps line(s). They may also run on a Local Area Network (LAN) (e.g., Ethernet, Fiber Distributed Data Interface (FDDI) and Asynchronous Transfer Mode (ATM)) using the H.320 standard so two terminals on the same LAN may communicate together. For example, the communication link 110, which connects terminal 101 to the Public Switched Telephone Network (PSTN), may include ISDN Basic Rate Interface (BRI) phone lines or switched 56 kbps lines. Alternatively, multimedia terminal 101 may be in conformance with H.324 protocols over a POTS (plain old telephone service) line instead of ISDN.

With respect to the communications link 110 over which, for example, an H.320 compliant terminal communicates, the ISDN BRI phone lines and the switched 56 kbps lines will be collectively referred to herein as the "bearer channels." If the bearer channels are ISDN BRI lines, the channels may consist of the conventional ISDN 2B+D channels in which the two B channels (where a B channel has a bandwidth of 64 kbps) are used for providing separate audio, video, and data streams. In a typical implementation, the video stream is at 64 kbps, the audio stream is at 16 kbps, and the data stream is at 32 kbps. Alternatively, if the bearer channels are a switched 56 kbps facility, the preferred embodiment would incorporate two 56 kbps lines, with the video, audio, and data streams being divided into the three streams as defined above for the ISDN line. An H.320 terminal is also capable of operating over a single 56 kbps switched line in which for maximum data transmission capability, the video and audio streams can be minimized. Furthermore, in setting up a multimedia call over ISDN or switched 56 kbps facilities, the allocation of bandwidth can be allocated to the audio, video and data streams in a flexible manner.

The video telephone/teleconferencing customer at the terminal 101 places a multimedia call through link 110 to a second party located at packet network telephone terminal 152. Connection of a call from the video telephone/ teleconference terminal 101 to a packet network telephone terminal 152 through a packet network 148 requires a call conversion process from a session set-up as a video telephone/teleconferencing call using for example the H.320 standard and then converting it to a packetized voice call in the H.323 or other similar protocol. The party making the video telephone/teleconferencing call will be referred to herein as the "customer", "calling party" or "H.320 caller". The party receiving the packetized voice call on a packet network telephone 156 will be referred to herein as the "packet network telephone user", "enduser" or "second party". As will be described in the discussion of the preferred embodiment, the second party is also capable of initiating packetized voice calls and the customer is capable of receiving the audio stream for the second party at terminal 101.

Link 110 is connected to switches within a Local Exchange Carrier (LEC) 112 associated with the terminal 101. The LEC may include a 5ESS™ (electronic switching system) switch manufactured by Lucent Technologies, Inc., or other type of switch. LEC 112 is connected to switch 118 within the Interexchange Carrier (IXC) switched network 116 by means of communication path 114 which may, for example, include ISDN Primary Rate Interface (PRI) lines consisting of 23B+D channels, T1 lines, switched 56 kbps lines, ATM, or other transmission facilities. Switch 118 may be a 4ESS™ switch manufactured by Lucent Technologies, Inc.

FIG. 1 further illustrates that switch 118 is connected through communication path 119 to a multimedia platform 120 located within the IXC 116. Communication path 119 connects the switch 118 to a Bandwidth Occupancy Xchange (BOX) 122, which may be a server which performs a gatekeeper function. In a preferred implementation, there are actually two versions of the BOX 122 mounted together for handling both analog and digital lines coming in. The BOX 122 would have a modem pool for handling both digital and analog.

The audio, video and data streams of the video telephone/ teleconferencing call arrive at the BOX 122 along communication path 119. The BOX 122 is in turn interconnected though link 124 to a Broadband Hybrid Multimedia Resource Allocator (BHMRA) 126, which is a gateway located in the multimedia platform 120. It is through the BHMRA 126 that the translations/negotiations or conversions of differing applications will take place. The BHMRA 126 works with many different implementations and brands of packet network telephony.

As is further illustrated in FIG. 1, the BHMRA 126 is interconnected with databases 127, 128 and 130. Endpoint descriptor or first database 130 is a packet network telephone address lookup database. First database 130 contains a wide variety of connection information necessary to establish the connection between terminal 101 and terminal 152 and will be discussed in detail below. The second database 127 contains translation software necessary to convert the video telephone/teleconference signal into analog and then from analog into the packet network telephone standard. Also, the second database 127 contains translation software necessary to change the packet network telephone signal into analog and then from analog into the video telephone/ teleconference signal. The third database 128 contains information for routing the call through the telecommunications system and packet network system in an optimal manner. A method of routing calls over a packet network was discussed in U.S. patent application Ser. No. 08/735,286, filed Oct. 22, 1996, and assigned to AT&T Corporation, which is hereby incorporated by reference.

Included in the information contained in the endpoint descriptor database 130 is the packet network address (e.g., Internet Protocol (IP) address) of the second party at the terminal 152. For most users, the packet network address is assigned a different designation each time they log on, so the endpoint descriptor database 130 is used to keep track of this changing address. The database 130 will act as a directory and match a second party's packet telephone identification number, multimedia number, or telephone number which is being called with the current unique packet network (e.g., IP) address.

There are a variety of ways in which the database 130 may obtain the constantly changing packet network address. In a first implementation, the computer 154, which contains a packet telephone 156 at terminal 152, sends a message to the first database 130 indicating that it is active and containing the unique packet network address of the packet telephone 156 and also the telephone number. In a second implementation, the PNSP 149 (e.g., Internet Service Provider) contains the information that the computer 154 is active and will send a message to the database 130 with the unique address and the telephone number of the computer 154. This second implementation is advantageous because, if the computer 154 crashes, then the PNSP 149 will remove the unique address from the database 130 since the computer 154 is no longer active. In a third implementation, the database 130 will be provisioned to query a set number of PNSPs and determine from the PNSPs which packet network telephone computers are active and will retrieve the associated unique addresses and store them in the database 130. In a fourth implementation, database 130 will be provisioned to systematically query the active databases of companies which conduct telephony operations on the packet data network 148. These internal packet telephone registries maintain lists of parties that are currently connected to the packet data network 148. These internal packet phone registries may be searched using the telephone number or a multimedia number of the second party to query whether the second party is currently connected to the packet network 148. In a fifth implementation, the database 130 will be provisioned to query the databases of the Internet telephony companies for information on all packet network telephone computer users who are currently active and will cache the unique addresses obtained on all of the users.

The first database 130 obtains the information discussed above under direction of the BHMRA 126 through communication path 136, which is connected to a packet network service provider (PNSP) 146 (e.g., such as an Internet service provider) and then to the packet network 148.

The first database 130 will also contain a wide variety of connection information, such as what type of endpoint is being called (e.g., the type of packet data network telephone software (or "soft phone") the second party is equipped with), the second party's name, number, code words and image files. It is understood that the connection information obtained is not limited to the above-described examples and may include many more types of information.

The connection is preferably made between the processing unit 106 and the terminal 152 in the following manner. The processing unit 106 dials a regular telephone number for connection to BHMRA 126. The BHMRA 126 will query the endpoint descriptor database 130 using the regular telephone phone number or multimedia number designated by the calling party at terminal 101 to obtain the variety of connection information discussed above. The most important piece of connection information is whether the second party is currently on the packet data network 148. If the person is not currently connected to the packet data network 148, the call session will be terminated. If the second party is currently connected to the packet network 148, the BHMRA 126 will download the second party's packet network address and other connection information from the first database 130.

The second party packet network telephone terminal 152 is connected to the packet data network 148 through communication path 150. The packet network telephone terminal 152 includes the packet network telephone computer (or just packet network telephone) 154 which contains the software telephone (or soft phone) and a second telephone 156 connected to the computer 154 which allows the second party to speak over a standard telephone if desired. Also, a hardware packet phone may be substituted for the "soft phone."

Using the information obtained from the first database 130, the BHMRA 126 receives the type of packet network telephony system version that is on the second party's computer 154. An example of a packet network telephony system is one manufactured by Vocaltec which produces the software product called "Internet Phone". With this information, the BHMRA 126 downloads the relevant translation software from second database 127. As previously discussed, the video conference call bandwidth is made up of audio, video and data segments. The BHMRA 126 has the ability, either before, simultaneously or after locating the packet network address, to split the audio, video and data streams of the video telephone/teleconferencing call. The BHMRA 126 will separate the audio stream in order to convert it into packetized form to be transmitted to the packet network telephone computer 154. The translation software downloaded from the second database 127 translates the audio stream of the video telephone/teleconference call signal into a packet network call signal to the second party terminal 152.

Typically, packet network telephone calls have low quality sound and inconvenient time lags. The call may be sent through a significant number of routers (e.g., more than a dozen) between the time the call enters the packet network and the time it reaches the second party's local packet network service provider (PNSP) 149. Because of the delays, the real-time nature of the call will be lost. Therefore, the third database 128 may use the information from first database 130 to determine the best way to route the call. One way would be to send the call signal through communication path or line 132 to the packet network service provider 142, which is local to the multimedia platform 120. Alternatively, the call signal could be sent through communication path or line 134 and then through multiple network connections 138 to a packet network service provider (PNSP) 144, which is as close as possible to the second party's terminal 152. This alternative method allows the real-time nature of the call to be preserved across the longest part of the network, and many routers and hubs which would add delay into the packet voice call are removed.

After the BHMRA 126 peels off the audio segment of the bandwidth, the translation software from second database 127 will then strip the audio portion of the call signal out of the video telephone/teleconferencing protocol and translate it into the packet network telephone protocol. The BHMRA 126 will then direct the call signal over communication path 132 in packet form to a packet network service provider (PNSP) 142. The packetized call will be routed through the packet network 148 to the packet network service provider (PNSP) 149 which is local to the second party's terminal 152. The call then travels through communication path 150 to the packet network telephone terminal 152. Communication path 150 may be, for example, a regular POTS line.

If the second party decides to answer the call, the connection is made between the second party terminal 152 and the customer terminal 101. The second party's return call signal is then routed back to the local PNSP 149, through the packet network 148, and to the BHMRA 126 itself. When the connection is established, the second party obtains the packet network address (e.g., IP address) of the BHMRA 126. Thus, the return voice may be routed back to the BHMRA 126 using packet network protocols such as TCP/IP and User Datagram Protocol (UDP)/IP. The BHMRA 126 will then use the translation software previously downloaded from second database 127 to translate the second party's call signal into the audio standard for a video telephone/teleconference call signal (such as the H.320 standard). The audio call signal from the second party may then be routed back through communication path 124 to BOX 122, and then back to the video telephone/teleconference terminal 101. The customer and the second party may then converse.

The second party at terminal 152 may also initiate a call to the video telephone/teleconference terminal 101. The packet telephone 154 communicates with the BHMRA 126 via packet network protocol (e.g., TCP/IP) over the packet network 148 to establish connection. The packet telephone 154 transmits the telephone number of the processing unit 106 to BHMRA 126, which then initiates connection. Because both the packet telephone 154 and the processing unit 106 are multimedia enabled, the BHMRA 126 is essentially performing a protocol conversion between standards such as H.320/ISDN and TCP/IP, and expanding the traditional packet telephone end so that both sides can handle the multimedia streams.

In an alternative embodiment, even if the computer 154 at the packet network telephone terminal 152 does not have packet network telephone software located in the packet network telephone computer 154, a call may still be completed. The 11 second party packet telephone computer 154 signals the first database 130 that it is active. In a preferred embodiment, this signaling may done automatically for each user by a PNSP 149, which will know when the computer 154 has connected to the packet network 148. In another embodiment, the second party packet telephone computer 154 runs a software application that performs the signaling function. The software application would not be a full-fledged packet telephone, but would serve to bootstrap the process of downloading a compatible packet telephone from the packet network 148. This way, the computer 154 could "borrow" the packet network telephony software on an as needed basis. The computer 154 could then take the packet telephone that best fits or requires the least amount of conversion with the processing unit 106.

Java™ is a computer programming language that is the basis upon which numerous new software applications are being built. One such application, Java™ telephone, is an example of a software telephone application that may be used to run telephone applications on any computer platform (e.g., because Java™ is platform independent). Because the enduser at the packet network telephone terminal 152 requires an application to signal that it is active, the BHMRA 126 may be notified that the enduser is receptive to downloading a packet network telephone software application, using a programming language such as Java™, and thus guaranteeing the enduser obtaining the correct software.

Figure 2A:
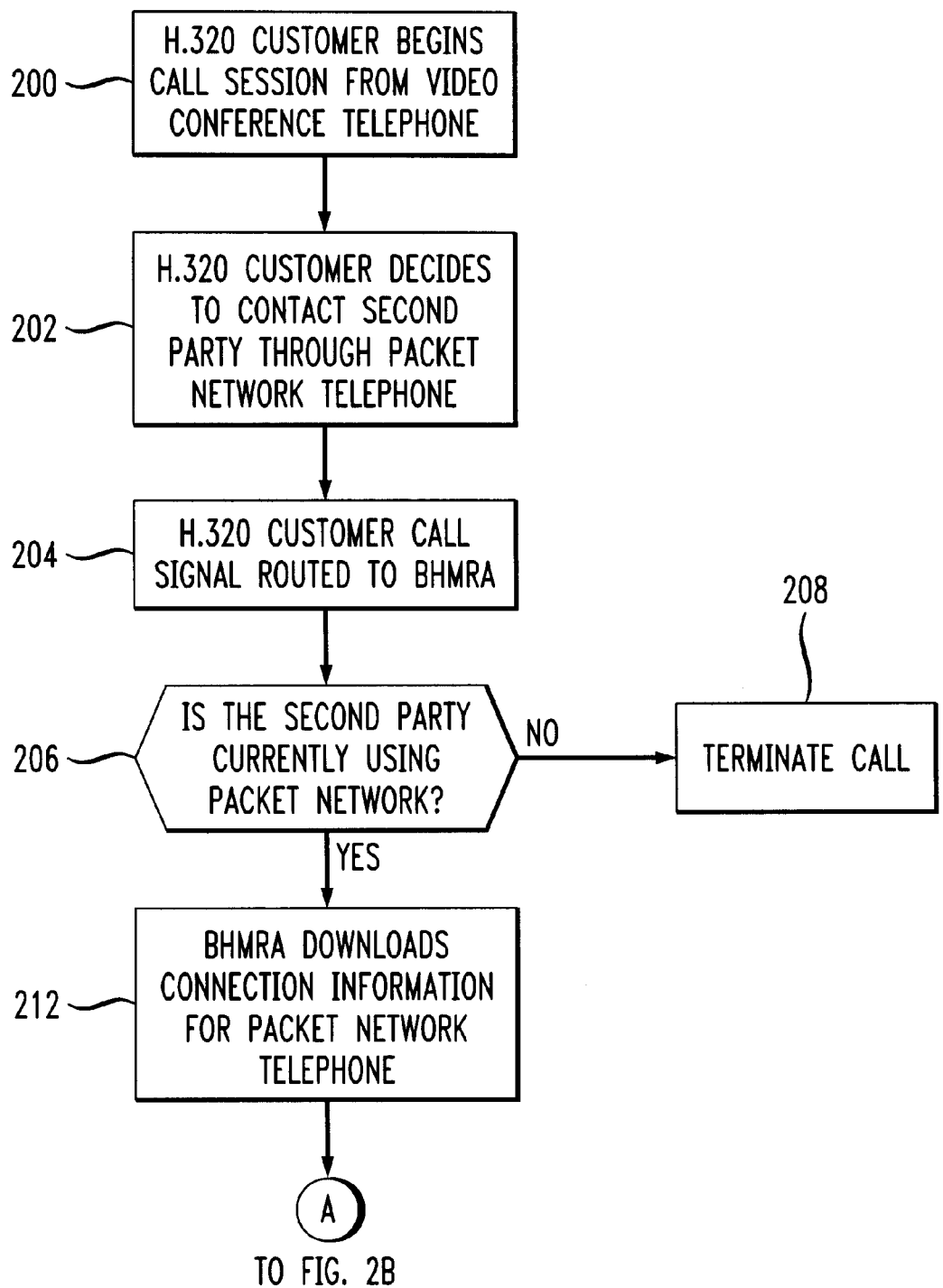
FIGS. 2A–C illustrate a flow chart showing steps involved in completing a video telephone/teleconference call as a packet voice call using the communications system of FIG. 1.
Figure 2B:
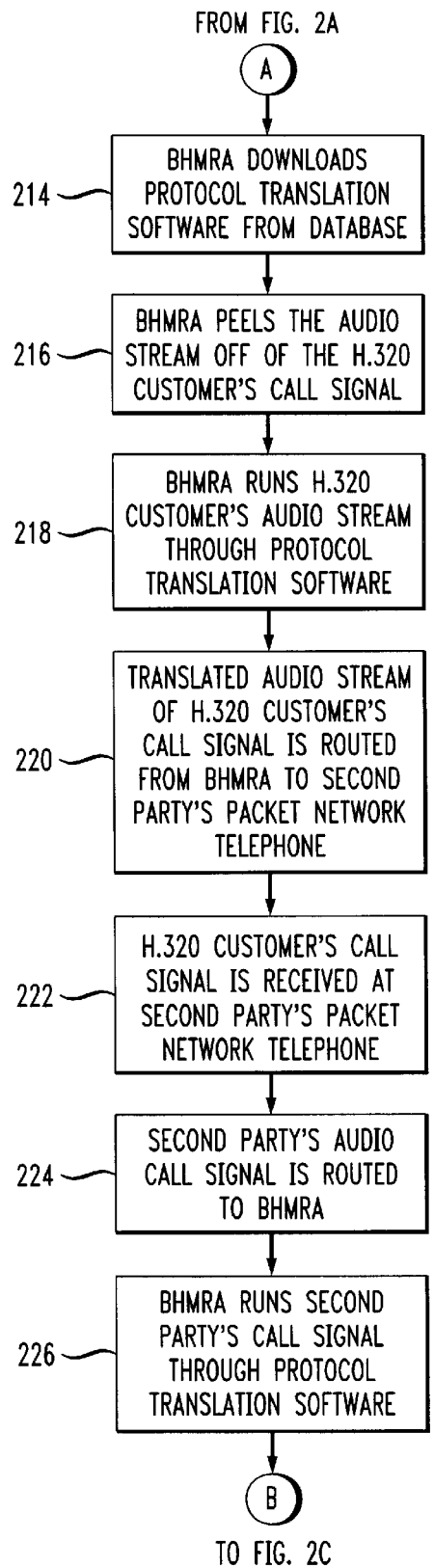
Figure 2C:
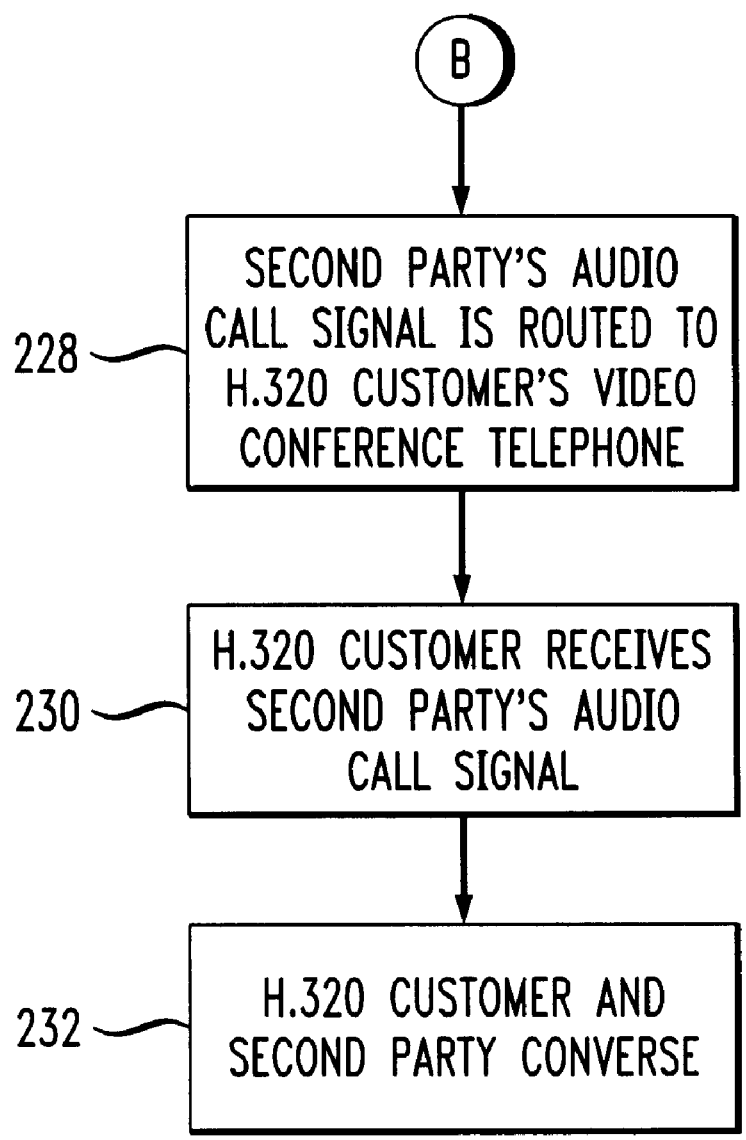

FIGS. 2A–C illustrates a preferred method of practicing the preferred embodiment of the present invention. In step 200, an H.320 (or H.324) customer initiates a call session from a video conference telephone 108. In step 202, the H.320 customer elects to contact a second party through a packet network such as the Internet. The H.320 customer call signal is routed to the BHMRA 126 in step 204. In step 206, the BHMRA 126 will look up the second party's number in first database 130 to determine if the second party is currently online. If information corresponding to the second party is stored in the database 130, then the second party is online and the system proceeds to step 212. If information corresponding to the second party is not located in database 130, then BHMRA 126 will direct database 130 to query previously provisioned PNSPs and packet network telephone companies as discussed above to determine if the second party is online. If the second party is still not found, then the call is terminated (step 208).

As previously discussed above, in an alternative embodiment, if the second party does not currently have a packet network telephone, the second party's computer may indicate that it would accept a call if the appropriate software were to be downloaded for at least the duration of the call. In that case, the BHMRA 126 downloads a software telephone to the second party.

In step 212, the BHMRA 126 downloads the connection information for the packet network telephone computer 154 from the first database 130. In step 214, the BHMRA 126 downloads the protocol translation software corresponding to the packet network telephone computer 154 from database 127. In step 216, the BHMRA 126 then separates the audio stream from the customer's H.320 call signal. Referring to step 218, the BHMRA 126 then runs the audio stream through the protocol translation software. The translated audio stream of the H.320 customer's call signal is then routed from the BHMRA 126 through the packet network 148 to the second party's packet network telephone 154 (step 220). In step 222, the H.320 customer's call signal is received at the second party's packet network telephone 154, and the second party's audio call signal is then routed to the BHMRA 126 (step 224). In step 226, the BHMRA 126 runs the second party's call signal through the protocol translation software.

The second party's audio call signal is then routed to the H.320 customer's video telephone/teleconference terminal 101 as shown in step 228. In step 230, the H.320 customer then receives the second party's audio call signal. The customer and second party may then converse, as is illustrated in step 232.

The foregoing is merely illustrative of the principles of this invention and various modifications may be made by those skilled in the art without departing from the scope and spirit of the invention.

What is claimed is:

1. A method of establishing a communication path between a video telephone/teleconference terminal and a packet network telephone terminal comprising the steps of:
   receiving a call signal at a multimedia gateway from said video telephone/teleconference terminal;
   retrieving a packet network address associated with the packet network telephone terminal from a first database connected to said multimedia gateway;
   removing an audio stream from the call signal;
   downloading conversion software from a second database connected to the multimedia gateway;
   converting the audio stream into packetized form using the conversion software; and
   transmitting the audio stream in packetized form to the packet network address associated with said packet network telephone terminal.

2. The method of claim 1, wherein the first database obtains the packet network address associated with the packet network telephone terminal from the packet network telephone terminal.

3. The method of claim 1, wherein the first database obtains the packet network address associated with the packet network telephone terminal from a packet network service provider.

4. The method of claim 1, wherein the first database obtains the packet network address associated with the packet network telephone terminal from a packet network telephone registry.

5. The method of claim 1, wherein the first database downloads a plurality of packet network addresses from a plurality of packet network service providers.

6. The method of claim 1, further comprising the step of:
   downloading packet network telephone software to the packet network telephone terminal.

7. The method of claim 6, wherein the downloaded packet network telephone software is in Java™ computer language.

8. The method of claim 1, wherein the packet network address is an IP address.

9. The method of claim 1, wherein the packet network is the Internet.

10. The method of claim 1, wherein the telephone/teleconference call is transmitted in the H.320 standard.

11. The method of claim 1, wherein the telephone/teleconference call is transmitted in the H.324 standard.

12. A method of establishing a communication path between a video telephone/teleconference terminal and a packet network telephone terminal via a packet network comprising the steps of:
   routing a video telephone/teleconference call signal from the video telephone/teleconference terminal to a multimedia gateway;
   retrieving a packet network address associated with the packet network telephone terminal in a first database;
   removing an audio stream from the video telephone/teleconference call signal;
   downloading conversion software from a second database connected to the multimedia gateway;
   converting the audio stream into packetized form using the conversion software; and
   transmitting the audio stream in packetized form to the packet network address associated with the packet network telephone terminal.

13. A communication system for establishing a communication path between a video telephone/teleconference terminal and a packet network telephone terminal comprising:
   a multimedia gateway connected with said video telephone/teleconference terminal for receiving a video telephone/teleconference call transmitted from said video telephone/teleconference terminal;
   wherein said multimedia gateway is adapted to remove an audio stream from the video telephone/conference call;
   a first database connected to said multimedia gateway;
   said first database including a packet network address associated with the packet network telephone terminal;
   a second database connected to said multimedia gateway and said second database containing conversion software;
   wherein said multimedia gateway converts the audio stream to a first packetized stream using said conversion software; and
   the packet network telephone terminal located at the packet network address for receiving the first packetized stream.

14. The system of claim 13, wherein
   the packet network telephone terminal is adapted to transmit a second packetized stream from the packet network telephone terminal to the multimedia gateway.

15. The system of claim 13, wherein the first database obtains the packet network address associated with the packet network telephone terminal from the packet network telephone terminal.

16. The system of claim 13 wherein the first database obtains the packet network address associated with the packet network telephone terminal from a packet network service provider.

17. The system of claim 13, wherein the first database is connected to a plurality of packet network telephone registries.

18. The system of claim 13, further comprising:
   a third database connected to said multimedia gateway and said third database containing routing information.

19. The system of claim 13, wherein the telephone/teleconference call is in the H.323 standard.

20. The system of claim 13, wherein the telephone/teleconference call is in the H.320 standard.

21. The system of claim 13, wherein the telephone/teleconference call is in the H.324 standard.

22. The system of claim 13, wherein a packet network telephone located at the packet network telephone terminal is downloaded from the packet network for the duration of the video telephone/teleconference call.

23. The system of claim 13, wherein the packet network telephone is a JAVA™ phone.

24. The system of claim 13, wherein the packet network telephone terminal is adapted to signal to the first database that it is capable of downloading a packet network telephone.

25. A communication system for establishing a communication path between a video telephone/teleconference terminal and an Internet telephone terminal comprising:
   a multimedia gateway connected with said video telephone/teleconference terminal for receiving a video telephone/teleconference call transmitted from said video telephone/teleconference terminal in H.320 format;
   wherein said multimedia gateway is adapted to remove an audio stream from the video telephone/conference call;
   a first database connected to said multimedia gateway;
   said first database including an IP address associated with the Internet telephone terminal;
   a second database connected to said multimedia gateway and said second database containing conversion software;
   wherein said multimedia gateway converts the audio stream to a first packetized stream using said conversion software; and
   the Internet telephone terminal located at the IP address for receiving the first packetized stream.

* * * * *